Dec. 31, 1963 R. A. BRADBURY 3,116,477
REDUNDANT MULTIVIBRATOR CIRCUIT
Filed March 27, 1962

INVENTOR.
RUDOLPH A. BRADBURY
BY Wade Koontz
ATTORNEY and
James S. Shannon
AGENT United States Patent Office 3,116,477

Patented Dec. 31, 1963

3,116,477

REDUNDANT MULTIVIBRATOR CIRCUIT

Rudolph A. Bradbury, Saugus, Mass., assignor to the United States of America as represented by the Secretary of the Air Force Filed Mar. 27, 1962, Ser. No. 182,989
3 Claims. (Cl. 340—248)
(Granted under Title 35, U.S. Code (1952), sec. 266)

The invention described herein may be manufactured and used by or for the United States Government for governmental purposes without payment to me of any royalty thereon.

This invention relates to an information transmission circuit employing the principle of redundance and, particularly, to a multivibrator circuit redundantly arranged to achieve a high degree of reliability during performance.

The transmission of information from one point to another in a system is often interrupted by intermittent or total failure of one or more components which form a part of the transmission chain. One solution to the problem of such failures relied upon when other remedial measures prove either too expensive or impractical is to establish a plurality of independently operable channels duplicated in a parallel network commonly known in the art as a redundant circuit. Each channel is exclusively responsible for fulfilling the operational demands of the system and is connected actively into the system to preserve continuity should one or more of the other channels become inoperative. Recent concern over the integrity of system components and their probability of failure has been increasingly reflected in design efforts which strive for greater component reliability and immunity to suddenly occurring component defects.

Accordingly, one object of the invention is to provide an information transmission circuit of substantially improved reliability by virtue of a redundant arrangement.

Another object of the invention is the provision of an information transmission circuit whose reliability is insured by a redundant arrangement capable of rapidly and decisively indicating the existence of a circuit fault.

A further object of the invention is to provide an information transmission circuit employing multivibrator switches arranged in redundance wherein failures tending to render the multivibrator sections inoperative are indicated in an economical manner free from complexity.

To carry out the foregoing objects, two duplicate bistable multivibrators are connected in parallel relationship so as to independently supply voltage variables to an external load circuit. To couple the multivibrators individually to the load, output control gates interconnecting each multivibrator and the load are actuated by a third bistable multivibrator whose output determines which of the output control gates is connected in the load circuit. Failure of either of the load supplying multivibrators to operate in the usual manner is detected by a sensing device which activates an alarm circuit. The output of the sensing device is simultaneously applied to a plurality of logical circuit elements responsive also to the outputs of the load supplying multivibrators and functioning when so dually actuated to supply the third multivibrator with a voltage indicative of which of the load supply multivibrators has failed. Appropriate switching action of the output control gates may follow depending on the bistable state of the third multivibrator and, in all cases, the output connection of the inoperative load supply multivibrator is interrupted while, simultaneously, the one remaining operative is substituted into the load circuit.

A complete understanding of the invention and an introduction to other objects and features not specifically mentioned may be had during the course of the following description when read in conjunction with the accompanying drawing, in which.

Figures 1, 2, 3:
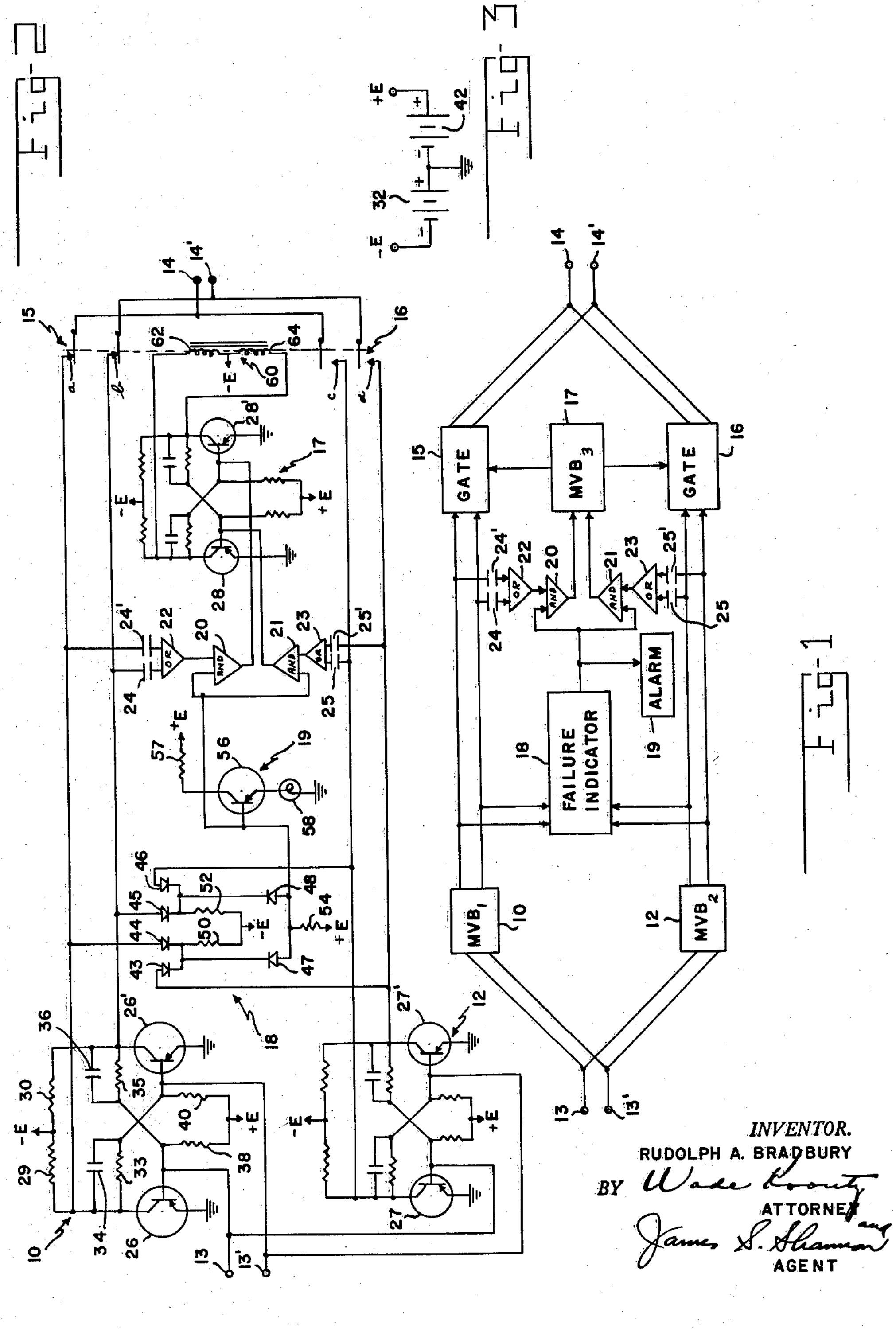
FIG. 1 is a simplified block diagram broadly describing a redundant system according to the invention.
FIG. 2 is a diagrammatically illustrated redundant circuit constructed in accordance with a preferred form of the invention; and, FIG. 3 shows a direct current power supply arrangement applicable to the present invention.

Referring now to FIG. 1, the invention broadly includes a pair of conventional bistable multivibrator devices 10 and 12 connected in parallel relationship and linking a pair of input terminals 13 and 13' with an external load circuit (not shown) coupled to output terminals designated 14 and 14'. Each multivibrator, in the usual manner, includes two sections responsive to signals at the input terminals and has outputs which remain available and unchanged until appropriate triggering by other input signals occurs. Included in series with multivibrators 10 and 12 are suitable output control gates 15 and 16, respectively, whose operation determines through which of the parallel paths a connection with the output terminals will be made. Control of the output control gates is effected by a third bistable multivibrator 17 being so related to the gates that, when multivibrators 10 and 12 are both operating in a satisfactory manner, the voltage gated to the output terminals is taken arbitrarily from either one, the other remaining on standby, and, upon failure of a multivibrator coupled to the load, the voltage passed to the output terminals is derived from the one remaining operative.

For control of the third multivibrator, the invention incorporates a failure indicator 18 so constructed as to deliver an output voltage only when fault conditions render either load supply multivibrator ineffective for further use at least without corrective action. Voltage from failure indicator 18 operates an alarm 19, which may be simple and inexpensive in form, and the voltage is supplied over an alternate path to one input terminal of a pair of logical circuit AND gates 20 and 21 symbolized herein in the conventional manner. The other input terminals of AND gates 20 and 21 are coupled to the output terminal of OR gates 22 and 23, respectively, similarly illustrated in logical symbol form. Operation of the AND gates is in the usual manner in that the output terminal of such gates is energized when and only when both inputs are energized. Conventional rules likewise govern the operation of the OR gates, each having an output when one or more of its inputs is energized.

Inputs to OR gates 22 and 23 are produced by multivibrators 10 and 12, respectively, and are applied through pairs of coupling capacitors designated 24, 24' and 25, 25' respectively. In the quiescent condition, multivibrator 17 opens one of the output control gates and closes the other, depending on which state it is set when initial direct current voltage is applied to the overall circuit. Should either of the AND gates receive a voltage at both inputs, which is the case upon failure of either multivibrator 10 or 12 as will be seen, an output voltage is supplied by the actuated AND gate to multivibrator 17. The consequent action of multivibrator 17 reverses the switching action of the output control gates which interrupts the output connection of the defective multivibrator and causes the standby multivibrator to be switched into connection with the load circuit.

Reference is now made to FIG. 2, which shows a schematic diagram of a redundant circuit according to one form of the invention. The specific circuit arrangement there shown is identical to the general arrangement shown in FIG. 1. Thus, input terminals 13, 13' and output terminals 14, 14' correspond, respectively, to the input and output terminals shown in FIG. 1. Also, multivibrators 10 and 12, which are shown in FIG. 2 as linking the input and output circuits over duplicate paths, and multivibrator 17, correspond identically to those generally illustrated in FIG. 1. The arrangement in FIG. 1 of the AND and OR gates is presented unchanged in FIG. 2. As seen in FIG. 2, failure indicator 18, alarm 19, and output control gates 15 and 16, whose manner of operation and construction will be described below, are schematic representations of and correspond to similarly referenced elements shown in FIG. 1.

The three multivibrators of the FIG. 2 circuit may be any conventional multivibrator known in the art and, as herein shown, they comprise the basic Eccles-Jordan circuit. Each multivibrator contains two sections formed of PNP transistors arranged in common-emitter configuration and having collector, emitter, and base electrodes. The transistors of multivibrator 10 are designated 26 and 26′, and multivibrators 12 and 17 contain similar companion transistors denoted 27, 27′ and 28, 28′, respectively. The portions of the circuit associated with these multivibrators are identical. Accordingly, only the circuit components associated with transistors 26 and 26′ of multivibrator 10 will be designated by reference characters, it being understood that the elements associated with the other multivibrators may be identified by comparing them to corresponding elements associated with multivibrator 10.

Considering now the arrangement of multivibrator 10, the collectors of transistors 26 and 26′ are returned, via load resistors 29 and 30, respectively, to the negative terminal (−E) of a source of direct current which may, for example, be a battery 32, as shown in FIG. 3, having appropriate positive and negative polarity indications and its other or positive terminal (+E) connected to ground. A parallel R-C coupling network comprising a resistor 33 and capacitor 34 interconnects the collector of transistor 26 and the base of transistor 26′. The collector of transistor 26′ is similarly coupled to the base of transistor 26, by means of a combination comprising resistor 35 and capacitor 36. Return of the base electrodes of transistor 26 and 26′, via resistors 38 and 40, respectively, is made to the positive terminal (+E) of a source of direct current which may comprise a battery 42, shown also in FIG. 3, having suitable polarity indications and its negative terminal referenced to ground. Direct connections couple the base electrodes of transistors 26 and 26′ to input terminals 13 and 13′, respectively. Similar connections extend between input terminals 13 and 13′ and the base electrodes of transistors 27 and 27′, respectively, of multivibrator 12, so that corresponding sections of multivibrators 10 and 12 are energized simultaneously by trigger voltages impressed on the input terminals. Other methods for alternating the current conditions in the sections of the multivibrators are too well known to deserve elaboration here and it will thus be understood that collector triggering, rather than the base triggering method given, may effectively be used to accomplish this purpose.

As previously set forth, a breakdown in operation in multivibrators 10 and 12 is detected by failure indicator 18, specifically illustrated in FIG. 2. As there shown, the failure indicator comprises a diode matrix of six diode rectifiers 43 to 48, inclusive, arranged in three groups 43—44, 45—46, and 47—48, of two each with each group performing a specific logical function to be described. In the circuit shown, the collectors of transistors 26 and 26′ of multivibrator 10 are coupled to the anodes of diodes 44 and 45, respectively, and the collectors of transistors 27 and 27′ of multivibrator 12 are coupled to the anodes of diodes 46 and 43, respectively. Diodes 43 and 44 have their cathodes connected to each other and to the negative terminal (−E) via a resistor 50. In similar fashion, connection between negative terminal (−E) and the cathodes of diodes 45 and 46 is made through a resistor 52, the cathodes of the latter diodes being connected to each other. Voltage appearing at the cathodes of diodes 43 and 44 is applied as the input to diode 47. The input to diode 48 is, on the other hand, the voltage appearing at the cathodes of diodes 45 and 46. Return of the anodes of diodes 47 and 48 to the positive terminal (+E) of battery 32 is completed through a resistor 54.

Considering now the manner of operation of failure indicator 18, the voltages applied to the anodes of diodes 43 and 44 must be negative simultaneously in order to supply diode 47 with a negative input. When this occurs, diode 47 is forwardly biased and conducts so that a negative voltage, that at negative (−E), is produced at the anode of diode 47 and, of course, at the anode of diode 48. When, however, either diode 43 or diode 44 is forward biased, the voltage delivered to the cathode of diode 47 is positive, leaving its anode potential that at positive voltage terminal (+E). By a similar analysis, it may be seen that applying negative voltages simultaneously to the anodes of diodes 45 and 46 will produce a negative voltage at the cathode of diode 48, whereby diode 48 conducts and its anode, as well as the anode of diode 47, becomes negative. A positive voltage applied to the anode of either diode 45 or 46 will render diode 48 nonconducting and, hence, the anode voltage of diode 48 positive. Therefore, it will hereinafter be understood that the output voltage of failure indicator 18 is that energizing the anodes of diodes 47 and 48, and it may be seen that the polarity of the failure indicator output voltage may either be poistive or negative, depending on the polarity of the respective input voltages applied to the two diode groups comprising diodes 43 through 46, inclusive.

The output voltage of the failure indicator is applied to alarm 19 which, as herein shown, comprises a PNP transistor 56 having base, emitter, and collector electrodes. The base of transistor 56 is coupled to the anodes of diodes 47 and 48, the collector is returned to the positive voltage terminal (+E), via a resistor 57, and the emitter is coupled to one end of a suitable indicating device, herein schematically shown as indicating lamp 58, having its other end returned to ground. In the quiescent state, transistor 56 is reverse biased to cutoff due to the high positive voltage representing the steady state output of failure indicator 18. Lamp 58, therefore, remains dark. Should failure indicator 18 produce a negative output voltage, as occasioned for reasons previously established, transistor 56 will be triggered on thereby lighting lamp 58. Numerous other indicating devices could be utilized advantageously in the invention and the lamp 58 depicted herein is shown merely as an illustrative example.

The output voltage of failure indicator 18 also serves as one input to AND gates 20 and 21, the other inputs being supplied, respectively, by OR gates 22 and 23 which are capacitively coupled to opposiing collectors of multivibrators 10 and 12, respectively. Diagrammatic symbols representing the AND and OR gates shown in FIG. 2 agree with those generally used in logic schematics, and, since the manner in which these gates operate is known to those skilled in the art as considered briefly in connection with the FIG. 1 block diagram, a detailed discussion of their specific construction will not be given. In the system of the present invention, it will be assumed that AND gates 20 and 21 are of the negative input type, that is, a negative voltage is generated as the outputs of such gates when and only when both input terminals are energized simultaneously with negative signals. A further assumption made, but now concerning the operation of the OR gates, is that these gates similarly are of the negative input type. Accordingly, each OR gate generates a negative output when one or the other of its inputs is energized by a negative voltage. With this construction, it may be seen that regardless of which state multivibrators 10 and 12 are set during normal operation, the polarity of the OR gate inputs is such that an output from each OR gate is generated. AND gates 20 and 21, therefore, are supplied with one input in the standby condition. The output terminals of gates 20 and 21 can thus be set negatively upon applying appropriate polarity voltages to their respective inputs. Negatively developed voltages at the outputs of these gates are impressed upon multivibrators 17 to serve as input triggers, the base of transistor 28 being coupled with the output terminal of gate 21 and the base of transistor 28' being coupled with the output terminal of gate 20.

One form of apparatus suitable for effecting the switching action of output control gates 15 and 16 is coupled to receive the output of multivibrator 17 and, as herein shown, this apparatus comprises a relay generally designated 60 provided with multiple windings 62 and 64. The windings are joined at one end which connection in turn leads to the negative voltage terminal (—E) of battery 32. The other end of winding 62 is connected to the collector of transistor 28. Similarly, winding 64 of relay 60 has its other end connected with the collector of transistor 28'.

Relay 60 controls the operation of output control gates 15 and 16, as described in connection with the block diagram of FIG. 1. In the general construction, each output control gate includes a plurality of cooperating fixed and movable contacts of relay 60. Specifically, gate 15 includes a pair of front contacts of relay 60 labeled *a* and *b* and two movable contacts arranged to cooperate with the front contacts in the usual manner and being closed in the position shown. Gate 16 is similarly equipped and is provided with back contacts *c* and *d* of relay 60, each cooperating with one of two movable contacts held away from the back contacts in the position shown. The mechanical connection between the armature (not shown) of relay 60 and the movable contacts which it actuates is illustrated according to convention by the dashed line diagrammatically linking the movable contacts with the relay windings.

In the general construction of relay 60, current flow through one or the other of windings 62 and 64 depends on which of its bistable states multivibrator 17 is set. By reversing the setting of multivibrator 17, current flow conditions in windings 62 and 64 are reversed so that current flow in the one energized ceases and in the other begins. This reverses the polarity of the relay pole pieces thereby actuating the armature to close the contacts that are open and open those that are closed. As will be brought out below, it is assumed that transistors 28 and 28' of multivibrator 17 are cutoff and conducting, respectively. With this assumption, winding 64 becomes energized over a circuit extending from the negative terminal (—E) at the junction of windings 62 and 64, through winding 64, the collector-emitter circuit of transistor 28', and to ground. Current flow through winding 62 at this time is made effectively zero so that winding 62 is de-energized. The de-energized condition of winding 62 may conveniently be explained by considering that the one end of winding 62 coupled to the collector of transistor 28 is essentially at the full negative value of battery 32 while the other end is coupled to the negative terminal (—E) of battery 32. Therefore, in effect, winding 62 is short-circuited. As the polarity of the collector voltages of transistors 28 and 28' will be reversed when multivibrator 17 is set to its alternate state, it will be realized that with such a reversal winding 62 will now become energized and winding 64 will become de-energized, thereby moving the movable contacts of gate 16 into contact with back contacts *c* and *d* and opening front contacts *a* and *b*. The above construction, therefore, will hold to switch the appropriate output control gate into the load circuit depending on which winding of relay 60 is energized.

*Operation*

The operation of the redundant multivibrator circuit embodying the invention illustrated in FIG. 2 will now be described. In the system of the invention, the constants of the three multivibrators 10, 12 and 17 are so chosen that each multivibrator stabilizes in the steady state with one section cutoff and the other conducting to saturation, leaving the collector of the cutoff transistor set substantially to the full negative voltage of battery 32 and the collector of the saturated transistor set substantially to zero volts. With no input voltages applied to terminals 13 and 13', let us assume that transistors 26, 27 and 28 of the respective multivibrators 10, 12 and 17 are cutoff. It therefore follows that transistors 26', 27' and 28' are conducting at saturation. As a result of the specified stable states of multivibrators 10 and 12, neither of the two diode groups comprising diodes 43—44 and 45—46 are negatively energized simultaneously. Diodes 47 and 48 therefore remain reverse-biased. The resulting positive voltage fed to the base of transistor 56 keeps lamp 58 dark so that no failure indication is initiated. OR gates 22 and 23 meantime produce negative outputs due to the negative collector voltage being supplied thereto by multivibrators 10 and 12, respectively. However, notwithstanding the negative output of the OR gates, the admission to each AND gate of the positive output of failure indicator 18 precludes either of the AND gates from generating an output. With no output from the AND gates, the collector voltage of transistor 28 is negative, as noted above, while the potential at the collector of transistor 28' is essentially zero. In a manner previously set forth, a path for energizing winding 64 of relay 60 is completed through transistor 28' whereas winding 62 remains de-energized. With winding 64 energized, front contacts *a* and *b* of relay 60 are engaged by their associated movable contacts to close gate 15, and the movable contacts associated with back contacts *c* and *d* are operated to open gate 16. Only the output of multivibrator 10 now supplies the load, the multivibrator 12 being disconnected from the output circuit by gate 16.

In the description, first consideration will be given to a defective condition arising in multivibrator 10. Suppose, therefore, that an internal failure in multivibrator 10 causes the collector voltage of transistor 26' to decrease to essentially the negative value at terminal (—E). Since bistable multivibrator theory requires one section to be "on" while the other is "off," warning of the defect must be given to allow for corrective procedures. As long as the discrepancy in multivibrator 10 persists, diodes 45 and 46 of the failure indicator are so biased as to supply diode 48 with a correspondingly negative input. Conduction in diode 48 now occurs leaving the base of transistor 56 negative and furnishing a negative input to transistor 56 and both AND gates. Lamp 58 lights to initiate a failure indication, as is obvious. Excitation of AND gate 21 by the negative output of failure indicator 18 occurs in concert with the negative output of OR gate 23 and prompts gate 21 to produce a correspondingly negative voltage, which voltage is in turn applied to the base of transistor 28. The application of a negative trigger to the base of transistor 28 sets multivibrator 17 to its other state so that, following the transition period, the collector voltages of transistors 28 and 28' are zero and negative, respectively. The rise of the collector voltage of transistor 28 to zero now establishes a path for energizing winding 62 of relay 60 which path extends from the negative terminal (—E) of battery 32 at the point where windings 62 and 64 are joined, and through winding 62 and the collector-emitter circuit of transistor 28 to ground. Windings 64 meantime is effectively short-circuited, since the end thereof opposite that connected to negative terminal (—E) is essentially at a level equal to the value of battery 32. With windings 62 and 64 now energized and de-energized, respectively, back contacts *c* and *d* in gate 16 are closed, whereas front contacts *a* and *b* are opened. The advantage gained by the redundant system of the invention will be readily apparent since the operation of relay 60 switches the inoperative multivibrator 10 out of the load circuit and switches the other multivibrator 12 into the load circuit as its substitute.

For the case in which multivibrator 10 fails in the manner described and gate 16 already interconnects multivibrator 12 and the load circuit, the voltage applied to multivibrator 17 from AND gate 21 will have no effect. This may readily be understood by observing that under previously made assumptions transistor 28 of multivibrator 17 must be conducting in order for contacts *c* and *d* of gate 16 to be closed. With transistor 28 already conducting, applying a negative pulse to its base from gate 21 merely abets the conductive effect. Such events may alternately be explained by considering that multivibrator 17 will cause a shift in the functions of output control gates 15 and 16 in response to a multivibrator failure of the type described only if the respective functions of gates 15 and 16 at the time of failure are such as to warrant a switching operation.

The failure of multivibrator 12 to operate in the normal manner similarly will be verified by the illustrated embodiment of the invention. In this latter case, we will asume that the failure of multivibrator 12 is reflected by collector voltages of transistors 27 and 27′ falling simultaneously to substantially the voltage at the negative voltage terminal (−E). This departure from the normal mode will be sensed by diodes 43 and 44 in the diode matrix of failure indicator 13 and will be recorded in the form of a negative voltage applied to the base of transistor 56 and AND gates 20 and 21 through diode 47. With transistor 56 of the alarm triggered "on" attention to the defective operation will be attracted by lighting lamp 58. AND gate 20 alone, however, will develop a negative output voltage as AND gate 21 is prevented from similarly developing an output due to the dormant condition of OR gate 23 caused by the failure of multivibrator 12. The operation of exciting the appropriate winding of relay 60 to gate load terminals 14, 14′ to the operating multivibrator 12 is again completed by multivibrator 17 according to which of its states multivirator 17 is initially set. Thus, if multivibrator 17 is set such that winding 64 of relay 60 is energized, the negative swing at the base of transistor 28′ resulting from the output of AND gate 20 will not flip multivibrator 17 since a gate connection between multivibrator 10 and the output terminals already exists. If, on the other hand, the initial setting of multivibrator 17 is such that winding 62 is energized, the negative input to the base of transistor 28′ will render transistor 28′ conducting and transistor 28 cutoff when the flip-flop transition is completed. Winding 64 of relay 60 now will become energized, over the circuit previously established, and the roles of gates 15 and 16 are reversed to switch multivibrator 10 alone into the load circuit.

It is obvious, of course, that other conventional gating circuits known in the art may be employed to gate the output of multivibrators 10 and 12 to the load, and, it is, therefore, to be understood that the electromagnetic gate structure typified in FIG. 2 by relay 60 is merely illustrative, and is not intended as a limitation to the invention.

Moreover, it will be clear that conventional bistable multivibrator circuits other than those illustrated specifically in FIG. 2 may readily be utilized in the invention, so that multivibrator switching may be accomplished by employing equivalent multivibrator arrangements using vacuum tubes or analogous semiconductor devices.

It will be apparent at this point that the rear contribution of the invention to the art is to increase the probability of successful operation by a realistic degree which is determined reliably by evaluating the effects of specific deficiencies which may cause the multivibrators servicing the load to fail.

Although one embodiment of the invention has been illustrated and described, it will be apparent to those skilled in the art that various changes and modifications may be made therein without departing from the spirit of the invention in the scope of the appended claims.

What is claimed is:

1. In an apparatus for improving the reliability of multivibrator operation comprising, a pair of bistable load supplying multivibrators having input and output terminals, means for concurrently applying trigger pulses to corresponding input terminals of said multivibrators whereby at corresponding output terminals duplicate and redundantly available output voltages are developed, detecting means for sensing the failure of either of said multivibrators to maintain the distinguishable characteristics of the voltages appearing at their respective output terminals and deriving an output signal upon the occurrence of such failure, a normally de-energized indicating device energized by the signal of said detecting means, logic circuit means monitoring the output voltages of said multivibrators and connected to said detecting means and during such failure generating a voltage identifying which of said multivibrators remains in the bistable state, a load circuit, plural gate means individually operable to gate the output terminals of said multivibrators to said load circuit, and means for controlling the gates as a function of the voltage supplied by said logic circuit means including a third multivibrator set to either of its bistable states in a manner to operate said gate means to establish a voltage transmission path connecting said load circuit and the load supply multivibrator remaining in the bistable state.

2. In an apparatus for improving the reliability of multivibrator operation, a pair of bistable multivibrators having input terminals and output terminals, means for applying coincident trigger pulses to corresponding input terminals of said multivibrators whereby in the bistable states thereof substantially zero and negative voltages appear, respectively, on one and the other of the output terminals of each of said multivibrators, six diodes grouped in three pairs, a first pair having its cathodes connected together and the anodes connected to the negative and zero voltage output terminals of one and the other of said multivibrators, respectively, a second pair having its cathodes connected together and the anodes connected to the remaining output terminals of said two multivibrators, means for supplying a negative voltage to the cathodes of said first and second pairs so that the cathodes of said first and second pairs are energized negatively simultaneously only when the anodes thereof are energized negative simultaneously, a third pair having its anodes connected together and its cathodes connected to the cathodes of said first and second pairs, respectively, means for normally applying a positive voltage to the anodes of said third pair so that the anodes of the third pair are energized negatively when the voltage at either cathode of said third pair is at a negative value, said transition of the voltage at the cathodes of said third pair from a positive to a negative value being indicative of the failure of the multivibrator causing said transition to maintain negative and zero voltages at the output terminals thereof, logic circuit means monitoring the voltages at the output terminals of said multivibrators and being actuated by the negative value of voltage at the anodes of said third pair during such failure to generate a voltage identifying at which of said output terminals the distinction between voltages thereon is maintained, a load circuit, and gate means energized in accordance with the signal produced by said logic circuit means to gate said load circuit into connection with the one of said multivibrators whose negative and zero output terminal voltages reflect adherence to operation in the bistable mode.

3. In combinatoin with a pair of bistable multivibrators redundantly arranged in parallel to produce at respective output terminals thereof duplicate and individually available load supply output voltages, circuit means for improving the reliability of operation of said multivibrators comprising, an indicating device, a failure sensing means monitoring the output voltages of said multivibrators for producing an output voltage rendering said indicating device operative only upon the occurrence of a failure of either of said multivibrators to continue operation in the bistable mode, a third multivibrator having input and output terminals; logic circuit means having a first input responsive to the voltage produced by said failure sensing means, a second input monitoring the output voltages of said multivibrators, and two output terminals each connected to one of the input terminals of said third multivibrator; said logic circuit means producing at times when said failure sensing means derives an output voltage a signal applied to one of the output terminals thereof in accordance with which of said multivibrators remains operative in the bistable mode, said third multivibrator being set according to the energization pattern of said logic circuit means output terminals, a relay having two windings each connected to one output terminal of said third multivibrator, the energization of said windings being accomplished individually depending on which of its bistable states said third multivibrator is set, a load circuit, and gate means controlled by said relay and being effective in response to energization of said windings to establish a connection between said load circuit and the one of said load supply multivibrators reflecting a continuation of operation in the bistable mode.

References Cited in the file of this patent

UNITED STATES PATENTS

| | | |
|---|---|---|
| 2,773,944 | Karlson | Dec. 11, 1956 |
| 2,946,900 | Steinman et al. | July 26, 1960 |
| 3,047,816 | Drake et al. | July 31, 1962 |